(No Model.) 3 Sheets—Sheet 1.
W. P. WIDDIFIELD & A. T. BUTTON.
CAR BRAKE.
No. 247,453. Patented Sept. 20, 1881.
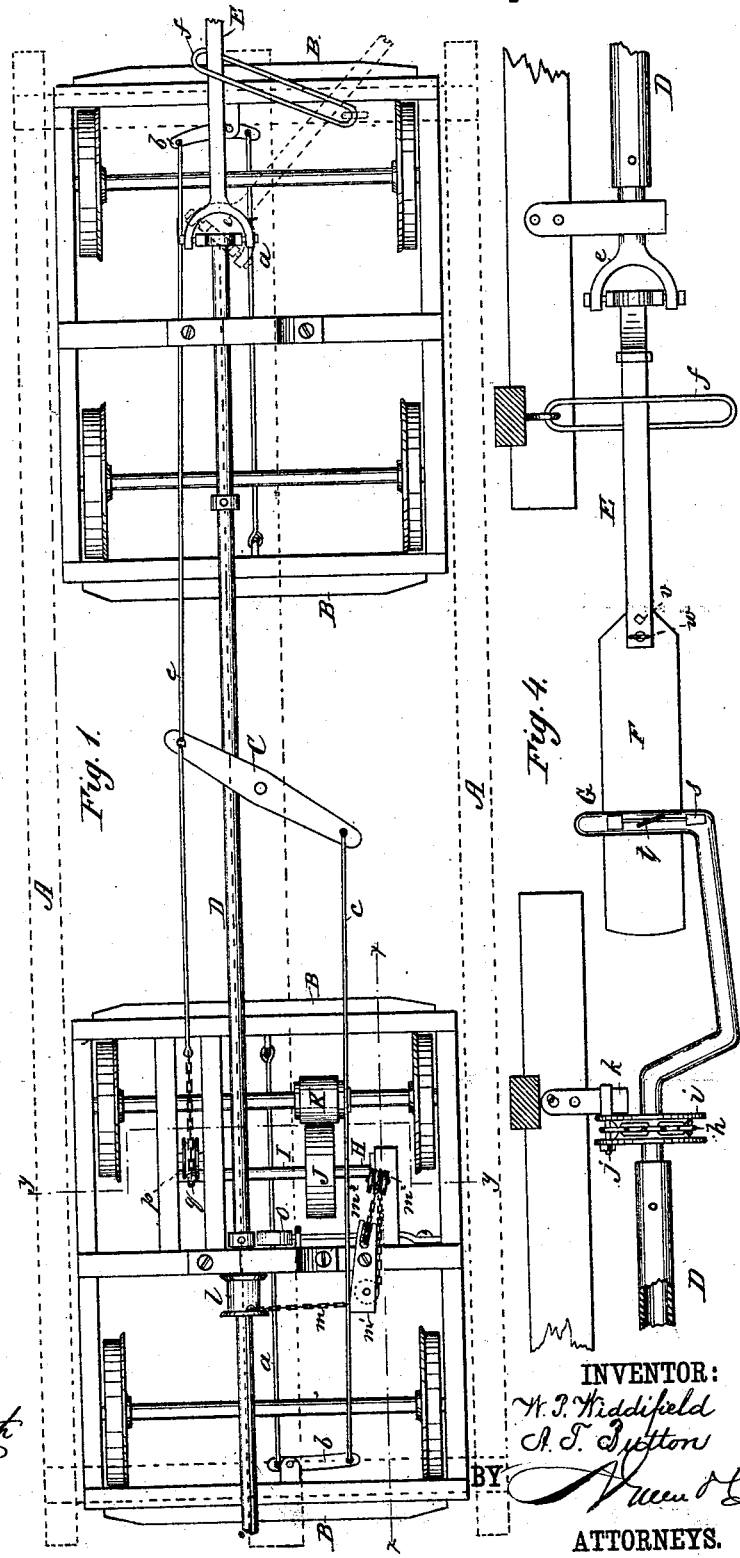
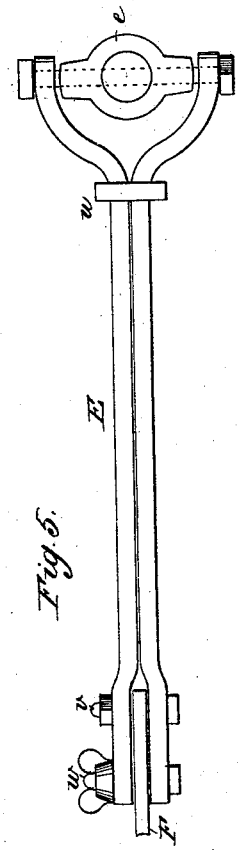
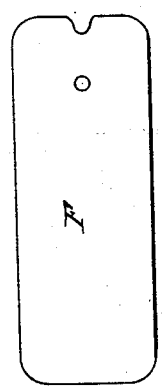
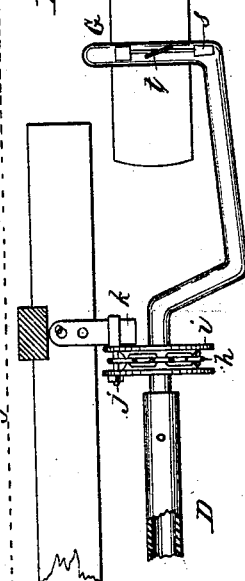
WITNESSES:
W. W. Hollingsworth
Edw. W. Byrn
INVENTOR:
W. P. Widdifield
A. T. Button
BY 
ATTORNEYS.

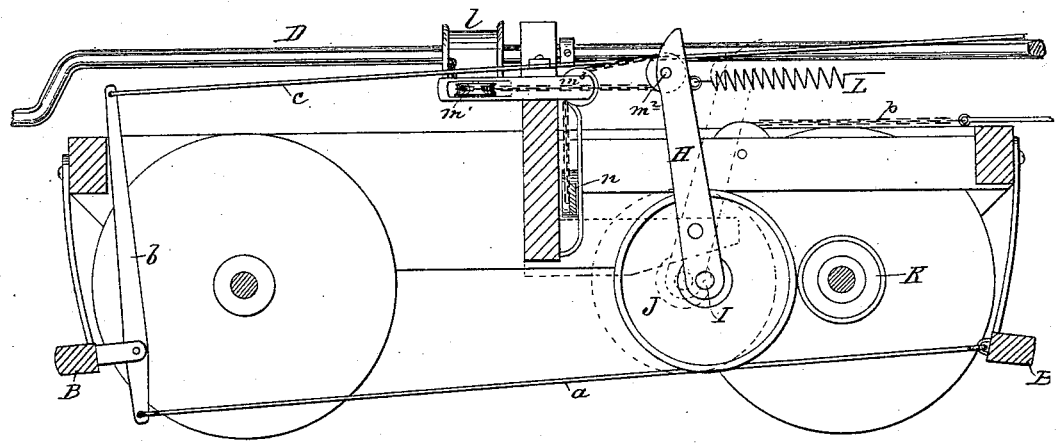
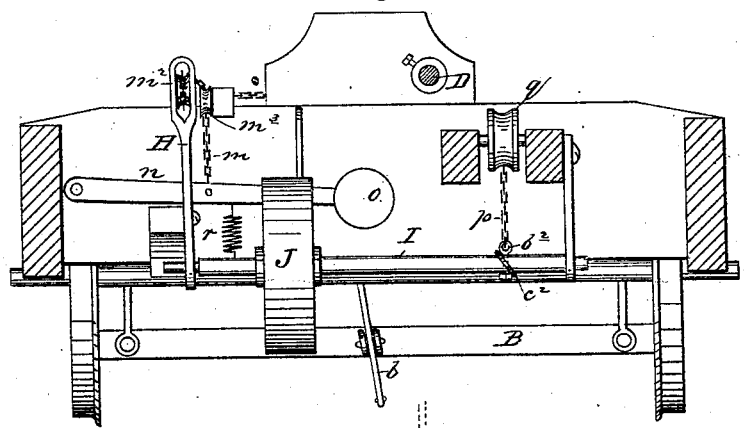
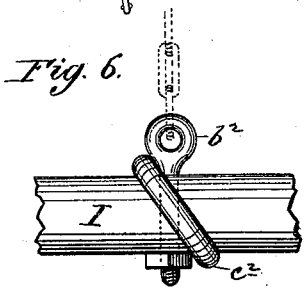

(No Model.) 3 Sheets—Sheet 3.
W. P. WIDDIFIELD & A. T. BUTTON.
CAR BRAKE.
No. 247,453. Patented Sept. 20, 1881.
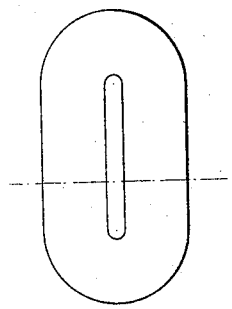
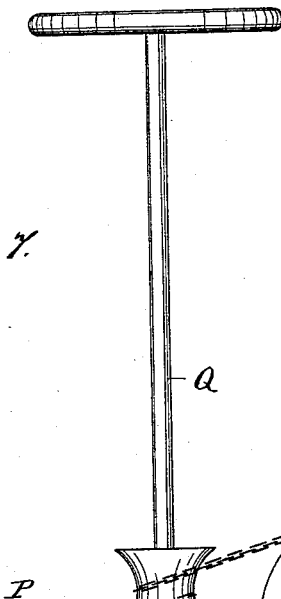
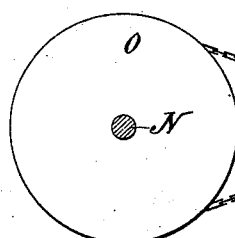
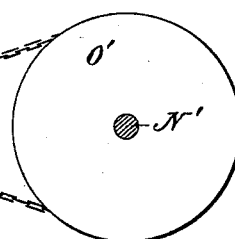
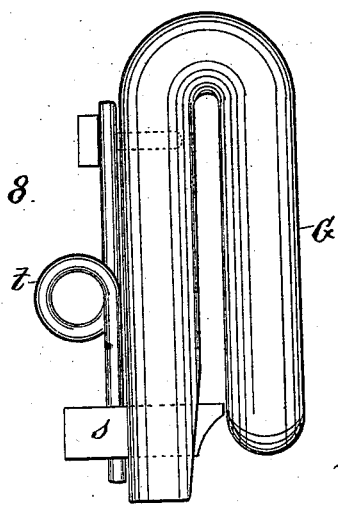
WITNESSES:
W. W. Hollingsworth
Edw. W. Byrn
INVENTOR:
W. P. Widdifield
A. T. Button
BY
ATTORNEYS.

UNITED STATES PATENT OFFICE.

WATSON P. WIDDIFIELD AND ANSON T. BUTTON, OF UXBRIDGE, ONTARIO, CANADA.

CAR-BRAKE.

SPECIFICATION forming part of Letters Patent No. 247,453, dated September 20, 1881.

Application filed January 21, 1881. (No model.)

*To all whom it may concern:*

Be it known that we, WATSON P. WIDDIFIELD and ANSON T. BUTTON, of Uxbridge, Province of Ontario, Dominion of Canada, have invented a new and Improved Car-Brake; and we do hereby declare that the following is a full, clear, and exact description of the same, reference being had to the accompanying drawings, forming part of this specification, in which—

Figure 1 is a plan view with the outline of the car in dotted lines. Fig. 2 is a vertical longitudinal section of one of the trucks, taken through line $x\ x$ of Fig. 1. Fig. 3 is a vertical transverse section of the same truck, taken through line $y\ y$ of Fig. 1. Fig. 4 is an enlarged detail view of the means for coupling the ends of the rod D between the cars. Fig. 5 is a view on a still larger scale of one end of the said coupling. Fig. 6 is an enlarged detail view of the connection of the chain to the shaft that winds it up. Fig. 7 is a view of the devices carried by the tender, which devices adapt the tender to be connected with either end of the car, and still make connection between the hand-wheel on the tender and the continuous brake-rod under the cars. This view of the device is such as would appear looking at the rear end of tender—*i. e.*, the crossed chain is arranged transversely to the tender and axes of the pulleys are parallel with the rails. Fig. 8 is an enlarged end view of the cranked portion of the brake-rod. Fig. 9 are details of a modification of the keeper G when used for automatic coupling.

The object of our invention is to provide a novel form of car-brake, constructed so as to permit the brakes to be applied at once to all the cars of the train from a single point and with an equal pressure.

Our brake is of that class in which a continuous rod, formed of sections, extends longitudinally with the car, and is jointed between the cars, which rods are coupled for a rigid revolution with each other, and are connected to devices for rotating the rod, and also to the brake devices.

Our invention consists in the novel construction and arrangement of parts, acting in connection with this general system, for the purpose of carrying it into practical and useful effect, which construction we will first particularly describe with reference to the drawings, and then point out in the claims.

In the drawings, A represents the floor-timbers of a car, beneath which are arranged the two trucks to which are applied the brake-bars B, the connecting-rods $a$, the levers $b$, and rods $c$, as usual, the rods $c$ being the draft-rods through which the power of a central lever, C, is applied to the brake-bars, and which lever is suitably fulcrumed beneath the floor of the car. A little to one side of the longitudinal axis of the car (so as to be out of the way of the coupling devices) is arranged in suitable bearings the continuous brake-rod D. This rod is cranked at one end, and such end is then bent up again into the range of the axis of the rod and doubled on itself, as shown in Figs. 4 and 8, to form a keeper, G, with a narrow opening to receive the flat end of the rod on the adjacent car. The other end of the rod terminates short of the end of the car, and connects through a universal joint, $e$, with a section, E, of the rod which carries the blade F, which enters the loop or keeper of the adjacent car at the other end. The object in making the universal joint $e$ on the brake-rod is to allow one end of this continuous rod to drop down when disconnected from the keeper of the adjacent rod, so as to allow the men to get access to the coupling between the cars.

To prevent the section E from dropping down on the ground, we suspend this section from a link, $f$, which is attached to the car, not immediately above the rod, but to one side, so that when the loose section E gravitates it also moves laterally to a point beneath the point of support of the link, as in Figs. 1 and 4.

We are aware that this jointed section of a rod, D, has been held up by a link suspended immediately above it, and we only claim the hanging of the link to one side, so as to automatically swing this section out of the way when uncoupled.

In constructing the continuous rod D, we prefer to make it of tubular iron about one and one-half inch diameter, and to connect it at points of permanent connection by riveted telescopic sections of metal $g$. The bent or cranked end of the rod we also make solid and rivet to the tubular sections.

For applying power to rotate the continuous rod D, a vertical shaft is arranged at the ends of each car, and has at the top a hand-wheel and at the bottom, below the car-floor, a chain, $h$, which is wound upon the vertical shaft, as usual, and which chain also passes around a grooved pulley, $i$, Fig. 4, rigidly fixed on the continuous rod D, so that the rotation of the hand-wheel rotates the continuous rod and applies the brakes in the manner hereinafter described. This continuous rod we arrange to be turned but a single revolution, and this we control by a bolt, $j$, passing through the pulley $i$, which bolt rests against, and at the end of a complete revolution of the rod D strikes against, the opposite side of a projection, $k$, depending from the car-body. This bolt $j$, it will be seen, serves the double purpose of a stop to limit the shaft to one revolution, and also as a point of attachment for the chain.

For applying the brake through the rotation of the rod D, we apply to this rod a chain-pulley, $l$, Figs. 1, 2, 3, upon which is wound a chain, $m$, that passes first around a pulley, $m'$, and then around a pulley, $m^2$, then around a third pulley, $m^3$, to a lever, $n$, having an adjustable weight, $o$, thereupon. Of these pulleys, $m^2$ is located on the upper end of a lever, H, which is fulcrumed to a support projecting from one of the trucks, and at its lower end carries a shaft, I, provided with a wheel, J, that may be projected into or out of engagement with a friction-wheel, K, on one of the car-axles. This wheel J is normally held out of engagement with the friction-wheel on the axle by a spring, L, Fig. 2. Now, whenever the continuous rod D is rotated the chain $m$ is wound up and the upper end of the lever H is drawn toward the pulleys $m'$ $m^3$, and the lower end of the lever and the shaft and wheel carried by the same are thrown toward the friction-wheel on the car-axle, whose rotation is imparted to the shaft I through wheel J. Now this shaft I, it will be seen, is suspended in a hanger, and is attached to a chain, $p$, Fig. 3, which passes over pulley $q$ and connects with the central lever, C, and which chain, as it is wound up on this shaft I, deflects lever C and applies the brake-bars, with their shoes, to the wheels.

In fastening the chain $p$ to the shaft I, we attach it to an eyebolt, $b^2$, (see Fig. 6,) passing through said shaft, and fasten about the shaft and eyebolt an elliptic and diagonally-arranged ring, $c^2$, whose function is that of a cam-guide to cause the chain to be wound up on the same side of the bolt without being tangled or crossed.

Each one of the cars is provided with a mechanism similar to that just described, and with which the continuous rod connects, so that when the continuous rod is turned from any point this continuous rod applies, through the peculiar mechanism on each car, the brakes of each and every car, securing by their simultaneous action the quick stoppage of the car, and doing away, if desired, with the employment of a great number of brakemen, which is a feature of merit, especially with long trains of cars.

In describing the function of the weighted lever, we would state that we are aware that weighted levers have been applied to car-brakes before for the purpose of directly applying the brakes. Our weighted lever has no such function, but acts in another capacity. Thus when the brake mechanism of a number of cars in a train is being operated by the same continuous rod there may be a lack of uniformity in the power transmitted to each car by reason of the looseness of the couplings of the continuous rod, or other cause. Our weighted levers are designed to equalize and render uniform the power which the continuous rod applies to each car, and it does it by making the chain $m$ in each car pull upon the lever H with a power which is equal to the gravity of the weight to which the other end of the chain is attached. This power may be increased or diminished by shifting the position of the weight on the lever, or by employing in connection therewith a supplemental spring, $r$, Fig. 3, acting in unison with the weight. This method of apportioning, equalizing, or distributing the power enables us to apply a more positive friction and greater power at the end of the train, where the cumulative looseness in the connection of the continuous rod D may render it necessary, and enables us to secure a uniform and useful effect throughout the whole train.

To provide for the operation of the continuous brake-rod from the tender of the locomotive, two points of connection have to be provided for the said rod, for the reason that as the rod is on one side of the center of the cars the rod at one end of the car would be on the right-hand side of the tender, and when coupled to the other end of the car, for going in the opposite direction, the rod would be on the left-hand side of the tender, and as the tender must be attached to either end of the car we use two points of connection for the rod at N N', (see Fig. 7,) which are at such a distance apart as to just equal twice the distance between the center of a car and the continuous rod, so that when going in one direction the brake-rod will be in line with the axis N, and when going in the other direction the brake-rod connects with the other axis, N'. These points are short shafts having connections at the rear end of the tender for the rod D, and carrying chain-wheels O O', around which is passed an endless crossed chain, P, wrapped around a pulley on the vertical rod Q on the tender, which rod Q bears at the top a hand-wheel, the turning of which imparts to the two shafts N N' a motion which gives the same rotation to the continuous brake-rod D, no matter which end of the car the tender may be attached to.

We will now describe more particularly the peculiar construction of the coupling between the ends of the sectional rod D. As before stated, one end of the said rod is cranked away from its axis, and then returned to the line of its axis again and bent upon itself to form parallel sections, which constitute a keeper or socket, G, into which the blade F of the adjacent end of the rod on the next car is inserted, and which blade has a free loose longitudinal movement through said keeper to take up the oscillation of the cars to and from each other. This keeper G (shown in enlarged view in Fig. 8) has at its lower and open end a bolt or catch, $s$, which closes in the space between the two sections of the keeper, from the tension of a spring, $t$, so that when the blade is to be inserted it is simply lifted and forced between the two sections of the keeper, into which the beveled end of the bolt $s$ permits it to pass, and which bolt then closes upon the blade and retains it. In constructing the other end of the rod the section E, outside of the universal joint, is made of two longitudinal pieces, (see Fig. 5,) which at one end are curved outwardly from each other and receive one of the bolts of the universal joint, and just at the point where they come together are fastened by a strap, $u$, or a bolt. At the other end of this section E the two branches again separate slightly to receive the thickness of the blade F. This blade has one end notched at its edge, and has a bolt-hole also close to it, and such blade is detachably fastened between the ends of the branches of section E by two bolts, $v\ w$, one of which bolts, $w$, has a thumb-nut, to permit the blade to be tightened or removed and another substituted for it.

When our devices as thus described are to be used in connection with cars having automatic couplings, we propose to make the cranked end of rod D in the form of a socket with a tapered mouth, as in Fig. 9, to receive the blade, so that said rods may also be automatically coupled.

Having thus described our invention, what we claim as new is—

1. In a car-brake, the combination, with the brake devices, and a rotary gear operated directly by the axle for applying them, of a continuous rod or shaft extending throughout the length of the train, and an equalizing device placed between the said continuous rod and the rotary gear, for equalizing and regulating the power applied to the brake devices of the several cars, as set forth.

2. The coupling for the continuous rod, consisting of a cranked end returned to the axial line and bent on itself to form a keeper, G, combined with a flat blade, F, on the other section, adapted to pass through the opening in the keeper, as described.

3. The combination, with a car and a car-brake, of the continuous sectional rod D, having a jointed section, E, and a link, $f$, attached to the car-body out of the vertical line of said rod, as described.

4. The section E, composed of two longitudinal pieces fastened together and curved apart at one end, to connect with the rod D and form a universal joint, and having at the other end the detachable notched and perforated blade F, held by bolts $v\ w$, substantially as and for the purpose described.

5. The continuous rod D, having its end cranked and bent upon itself to form a keeper, G, in combination with a spring catch or bolt.

6. The combination, with the rod D and the chain $h$, with wheel and rod for operating same, of a stop device, $j$, which forms an attachment for the chain and limits the movement of the shaft D to one revolution, as set forth.

7. The rod D, having rigid wheel $i$, with bolt $j$, in combination with the chain $h$ and the projection $k$, the said bolt serving as a connection for the chain, and serving, also, as a stop acting with the projection $k$, as and for the purpose described.

8. The combination, with the brake devices and the rod D, of the chain $m$, pulleys $m'\ m^2\ m^3$, weighted lever $n$, lever H, carrying shaft I and wheel J, and the friction-wheel K on the car-axle, substantially as shown and described.

9. The combination, with the shaft I and the chain $p$, of the eyebolt $b^2$ and the diagonally-arranged and elliptical ring $c^2$, as and for the purpose described.

WATSON P. WIDDIFIELD.
ANSON T. BUTTON.

Witnesses:
A. D. WILLIAMS,
G. W. BETTES.